(12) United States Patent
Liu et al.

(10) Patent No.: US 10,558,286 B2
(45) Date of Patent: Feb. 11, 2020

(54) ARRAY SUBSTRATE, TOUCH DISPLAY PANEL, AND TOUCH DISPLAY DEVICE THEREOF

(71) Applicant: Shanghai Tianma Micro-Electronics Co., Ltd., Shanghai (CN)

(72) Inventors: Liang Liu, Shanghai (CN); Feng Lu, Shanghai (CN); Zaiwen Zhu, Xiamen (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 106 days.

(21) Appl. No.: 15/786,007

(22) Filed: Oct. 17, 2017

(65) Prior Publication Data

US 2018/0039363 A1  Feb. 8, 2018

(30) Foreign Application Priority Data

Jun. 30, 2017 (CN) .......................... 2017 1 0524178

(51) Int. Cl.

| G06F 3/041 | (2006.01) |
| G02F 1/1333 | (2006.01) |
| G06F 3/045 | (2006.01) |
| G01L 1/22 | (2006.01) |
| G01L 1/20 | (2006.01) |

(52) U.S. Cl.
CPC ............ *G06F 3/0412* (2013.01); *G01L 1/205* (2013.01); *G01L 1/2281* (2013.01); *G02F 1/13338* (2013.01); *G06F 3/045* (2013.01); *G06F 3/0414* (2013.01)

(58) Field of Classification Search
CPC combination set(s) only.
See application file for complete search history.

(56) References Cited

U.S. PATENT DOCUMENTS

| 6,604,423 B1 * | 8/2003 | Irokawa ................. G01L 15/00 73/714 |
| 2015/0261371 A1 * | 9/2015 | Li ........................... G06F 3/041 345/174 |

(Continued)

FOREIGN PATENT DOCUMENTS

| CN | 1293357 A | 5/2001 |
| CN | 105511679 A | 4/2016 |

*Primary Examiner* — Jennifer Mehmood
*Assistant Examiner* — Deeprose Subedi
(74) *Attorney, Agent, or Firm* — Anova Law Group PLLC

(57) ABSTRACT

An array substrate, a touch display panel, and a touch display device are provided. The array substrate includes a plurality of pressure sensors. Each pressure sensor includes a first input terminal electrically connected to a first power input terminal, and a second input terminal electrically connected to a second power input terminal. The array substrate also includes a first connection line between the first input terminal of each pressure sensor and the first power input terminal. The first connection line has a first line resistance. In addition, the array substrate includes a second connection line between the second input terminal of each pressure sensor and the second power input terminal. The second connection line has a second line resistance. Further, the array substrate includes a ratio of a resistance of each pressure sensor to a sum of the corresponding first line resistance and second line resistance is the same.

20 Claims, 9 Drawing Sheets

(56) References Cited

U.S. PATENT DOCUMENTS

2017/0301304 A1* 10/2017 Gao ..................... G09G 3/3648
2018/0143718 A1*  5/2018 Kim ..................... G06F 3/0412
2018/0232076 A1*  8/2018 Xu .......................... G06F 3/044

* cited by examiner

ARRAY SUBSTRATE, TOUCH DISPLAY PANEL, AND TOUCH DISPLAY DEVICE THEREOF

CROSS-REFERENCE TO RELATED APPLICATIONS

This application claims the priority of Chinese patent application No. 201710524178.X, filed on Jun. 30, 2017, the entirety of which is incorporated herein by reference.

FIELD OF THE DISCLOSURE

The present disclosure generally relates to the field of display technology and, more particularly, relates to an array substrate, touch display panel and touch display device thereof.

BACKGROUND

Currently, a display panel with touch functions as a kind of information input tool has been widely used in a variety of electronic devices, such as an information inquiry machine in public places lobby, a computer and a cell phone that users use in their daily life and work, etc. In this way, the users only need to touch marks on the touch screen to achieve the operation of the electronic device, and avoid relying on other input devices, such as a keyboard and a mouse, etc. Thus, human-computer interaction is more straightforward.

To better meet the needs of the users, pressure sensors are usually provided in the touch screen to detect the touch pressure when the user touches the touch screen. The pressure sensor not only captures touch position information, but also captures magnitude of the touch pressure, enriching the applications of touch display technology.

To achieve the detection of touch pressure on various positions of the touch screen, the touch display screen generally includes a number of pressure sensors provided at different positions. Each pressure sensor includes two input terminals. A power input terminal provides a bias voltage for the pressure sensor through one input terminal of the corresponding pressure sensor. There is a certain line resistance between the input terminal of each pressure sensor and the corresponding power input terminal.

However, the line resistances corresponding to different pressure sensors are different, and self-resistances of different pressure sensors are different. Thus, the bias voltage between the two input terminals of each pressure sensor is different for the same input voltage from the power input terminal. When the touch display screen undergoes the same deformation under pressure, detection signal outputted from each pressure sensor is different, and accuracy of pressure detection performed on the touch display may be seriously affected. In addition, as each pressure sensor needs to output a same detection signal for the same deformation, when the detection signals are different, the pressure sensors need to be calibrated. Thus, the difficulty for calibrating the pressure sensors increases.

The disclosed device structures and methods are directed to solve one or more problems set forth above and other problems.

BRIEF SUMMARY OF THE DISCLOSURE

One aspect of the present disclosure includes an array substrate. The array substrate includes a plurality of pressure sensors. Each pressure sensor includes a first input terminal and a second input terminal. The first input terminal is electrically connected to a first power input terminal, and the second input terminal is electrically connected to a second power input terminal. The array substrate also includes a first connection line between the first input terminal of each pressure sensor and the first power input terminal. The first connection line has a first line resistance. In addition, the array substrate includes a second connection line between the second input terminal of each pressure sensor and the second power input terminal. The second connection line has a second line resistance. Further, the array substrate includes a ratio of a resistance of each pressure sensor to a sum of the corresponding first line resistance and second line resistance is the same.

Another aspect of the present disclosure includes a touch display panel. The touch display panel includes an array substrate. The array substrate includes a plurality of pressure sensors. Each pressure sensor includes a first input terminal and a second input terminal. The first input terminal is electrically connected to a first power input terminal, and the second input terminal is electrically connected to a second power input terminal. The array substrate also includes a first connection line between the first input terminal of each pressure sensor and the first power input terminal. The first connection line has a first line resistance. In addition, the array substrate includes a second connection line between the second input terminal of each pressure sensor and the second power input terminal. The second connection line has a second line resistance. Further, the array substrate includes a ratio of a resistance of each pressure sensor to a sum of the corresponding first line resistance and second line resistance is the same.

Another aspect of the present disclosure includes a touch display device. The touch display device includes a touch display panel. The touch display panel includes a an array substrate. The array substrate includes a plurality of pressure sensors. Each pressure sensor includes a first input terminal and a second input terminal. The first input terminal is electrically connected to a first power input terminal, and the second input terminal is electrically connected to a second power input terminal. The array substrate also includes a first connection line between the first input terminal of each pressure sensor and the first power input terminal. The first connection line has a first line resistance. In addition, the array substrate includes a second connection line between the second input terminal of each pressure sensor and the second power input terminal. The second connection line has a second line resistance. Further, the array substrate includes a ratio of a resistance of each pressure sensor to a sum of the corresponding first line resistance and second line resistance is the same.

Other aspects of the present disclosure can be understood by those skilled in the art in light of the description, the claims, and the drawings of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Figure 1:
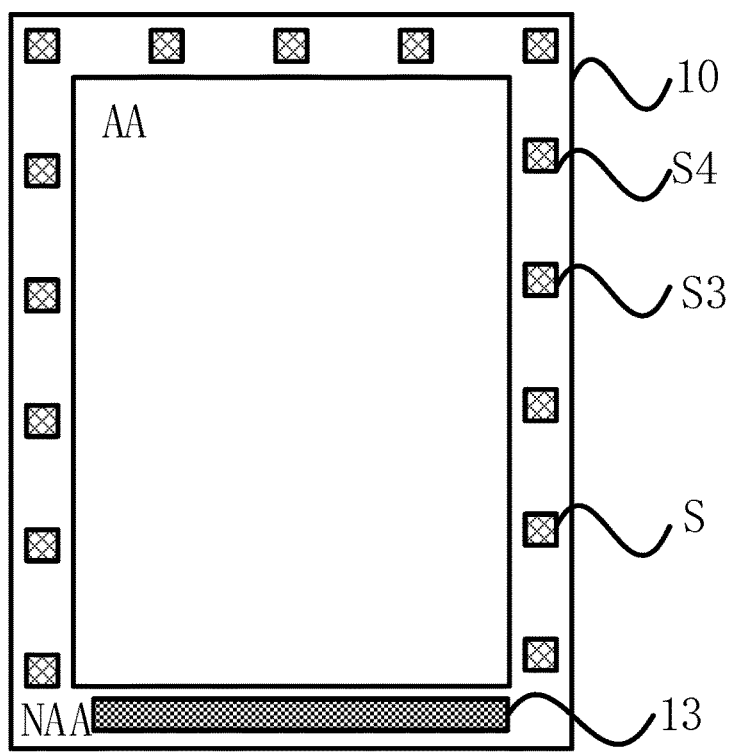
FIG. 1 illustrates a top view of an array substrate consistent with various disclosed embodiments of the present disclosure.
Figure 2:
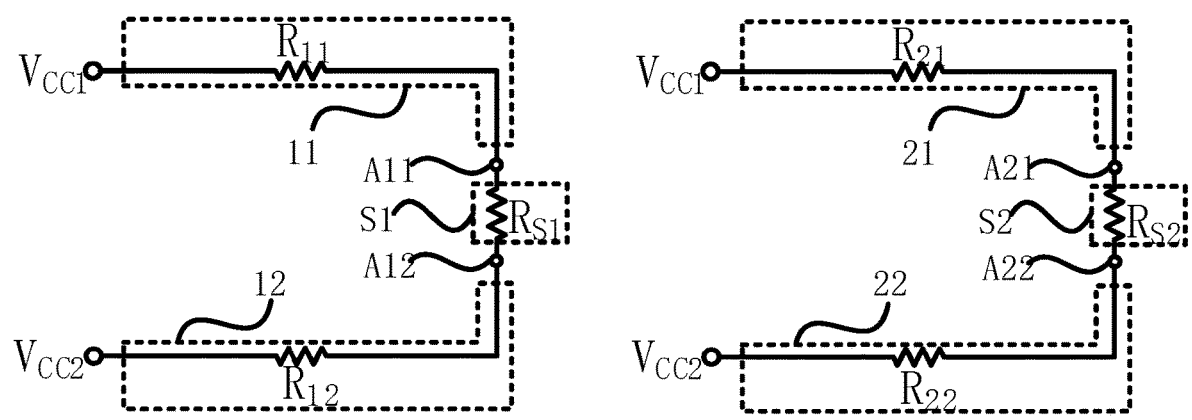
FIG. 2 illustrates an equivalent circuit of a connection relation in a pressure sensor consistent with various disclosed embodiments of the present disclosure.

FIG. 1 illustrates a top view of an array substrate consistent with disclosed embodiments, and FIG. 2 illustrates an equivalent circuit of a connection relationship of a pressure sensor consistent with disclosed embodiments. Referring to FIG. 1 and FIG. 2, the array substrate 10 may include a plurality of pressure sensors 'S'. A pressure sensor 'S1' is used as an example. The pressure sensor 'S1' may include a first input terminal 'A11' and a second input terminal 'A12'. The first input terminal 'A11' of the pressure sensor 'S1' may be electrically connected to a first power input terminal '$V_{cc1}$', and the second input terminal 'A12' may be electrically connected to a second power input terminal '$V_{cc2}$'. There may be a first connection line 11 between the first input terminal 'A11' of the pressure sensor 'S1' and the first power input terminal '$V_{cc1}$'. The first connection line 11 may have a first line resistance "$R_{11}$." There may be a second connection line 12 between the second input terminal 'A12' and the second power input terminal '$V_{cc2}$'. The second connection line 12 may have a second line resistance "$R_{12}$". A ratio of a resistance of each pressure sensor 'S' to the sum of the corresponding first line resistance and the second line resistance may be the same.

In one embodiment, referring to FIG. 2, the pressure sensor 'S1' and a pressure sensor 'S2' are selected as an example. A ratio of the resistance of the pressure sensor 'S1' to the sum of the corresponding first line resistance '$R_{S1}$' and the second line resistance '$R_{12}$', and a ratio of the resistance '$R_{S2}$' of the pressure sensor 'S2' to the sum of the corresponding first line resistance '$R_{21}$' and the second line resistance '$R_{22}$' may satisfy the following relationship:

$$\frac{R_{S_1}}{R_{11} + R_{12}} = \frac{R_{S2}}{R_{21} + R_{22}}.$$

A voltage between the first power input terminal '$V_{cc1}$' and the second power input terminal '$V_{cc2}$' may be set as '$V_{cc}$'. Then, a voltage '$U_{in1}$' between the first input terminal 'A11' and the second input terminal 'A12' of the pressure sensor 'S1' may satisfy the following relationship:

$$U_{in1} = \frac{V_{CC} \cdot R_{S_1}}{R_{S1} + R_{11} + R_{12}}.$$

A voltage between the first input terminal 'A21' and the second input terminal 'A22' of the pressure sensor 'S2' may satisfy the following relationship:

$$U_{in2} = \frac{V_{CC} \cdot R_{S_2}}{R_{S2} + R_{21} + R_{22}}.$$

Based on the above three formulas, when the ratio of the resistance '$R_{S1}$' of the pressure sensor 'S1' to the sum of the corresponding first line resistance '$R_{11}$' and the second line resistance '$R_{12}$' is equal to the ratio of the resistance '$R_{S2}$' of the pressure sensor 'S2' to the sum of the corresponding first line resistance '$R_{21}$' and the second line resistance '$R_{22}$', the voltage '$U_{in1}$' between the first input terminal 'A11' and the second input terminal 'A12' of the pressure sensor 'S1' may be equal to the voltage '$U_{in2}$' between the first input terminal 'A21' and the second input terminal 'A22' of the pressure sensor 'S2'. When applied to all the pressure sensors 'S', the bias voltage between the first input terminal and the second input terminal of each pressure sensor 'S' may be the same. In a case where a touch display panel undergoes the same deformation under pressure, detection signal outputted from each pressure sensor 'S' may be the same. In a case where the conventional touch display panel undergoes the same deformation under pressure, detection signal outputted from each pressure sensor 'S' may be different. Thus, the magnitude of the pressure obtained based on different detection signals may be different, thus the pressure detection of the touch display panel may be inaccurate. Compared to the conventional touch display panel, the accuracy of the pressure detection performed on the touch display panel may be improved, and the difficulty for calibrating the pressure sensor 'S' may be reduced in the present disclosure.

Figure 3:
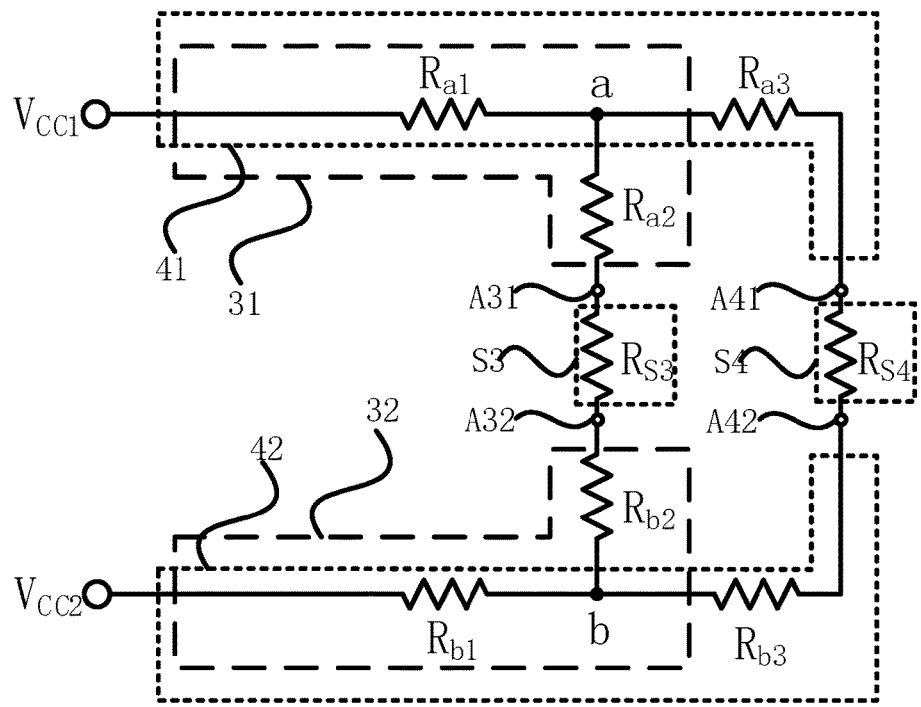
FIG. 3 illustrates another equivalent circuit of a connection relation in a pressure sensor consistent with various disclosed embodiments of the present disclosure.

FIG. 3 illustrates another equivalent circuit of the pressure sensor consistent with disclosed embodiments, Referring to FIG. 1 and FIG. 3, the first connection lines corresponding to the at least two pressure sensors 'S' may have a common portion. The second connection lines corresponding to the at least two pressure sensors 'S' may have a common portion. The first connection lines and the second connection lines corresponding to the pressure sensors 'S3' and 'S4' have common portions as an example. The first connection lines of the pressure sensors 'S3' and 'S4' may have a common portion (a portion from the first power input terminal '$V_{cc1}$' to a node 'a' illustrated in FIG. 3). The second connection lines of the pressure sensors 'S3' and 'S4' may have a common portion (a portion from the second power input terminal '$V_{cc2}$' to a node 'b' illustrated in FIG. 3). A first line resistance of a first connection line 31 corresponding to the pressure sensor 'S3' may be the sum of '$R_{a1}$' and '$R_{a2}$', and a second line resistance of a second connection line 32 corresponding to the pressure sensor 'S3' may be the sum of '$R_{b1}$' and '$R_{b2}$'. A first line resistance of a first connection line 41 corresponding to the pressure sensor 'S4' may be the sum of '$R_{a1}$' and '$R_{a3}$', and a second line resistance of a second connection line 42 corresponding to the pressure sensor 'S4' may be the sum of '$R_{b1}$' and '$R_{b3}$'.

Optionally, the resistance of the pressure sensor 'S' may be proportional to a distance from the first input terminal of the pressure sensor 'S' to the first power input terminal. Alternatively, the resistance of the pressure sensor 'S' may be proportional to a distance from the second input terminal of the pressure sensor to the second power input terminal. Optionally, referring to FIG. 1, the array substrate 10 may include a display area 'AA' and a peripheral circuit area 'NAA' surrounding the display area 'AA'. The pressure sensors 'S' may be provided in the peripheral circuit area 'NAA' of the array substrate 10. The array substrate 10 may include a driving chip 13 in the peripheral circuit area 'NAA'. The driving chip 13 may provide signals needed for the touch display panel, such as display control signals, and data signals, etc. The driving chip 13 may also provide a bias voltage to the first input terminal and the second input terminal of each pressure sensor 'S'. In other words, the first power input terminal and the second power input terminal may be integrated into the driving chip.

For example, referring to FIG. 1 and FIG. 3, positions of the pressure sensors 'S3' and 'S4' in the array substrate 10 are illustrated in FIG. 1. The pressure sensor 'S', which is far away from the driving chip, may be referred to a remote pressure sensor; and the pressure sensor 'S', which is close to the driving chip, may be referred to a proximal pressure sensor. Therefore, the pressure sensor 'S3' may be a proximal pressure sensor, and the pressure sensor 'S4' may be a remote pressure sensor. The pressure sensor 'S3' represents a proximal pressure sensor and the pressure sensor 'S4' represents a remote pressure sensor as an example in the following embodiments. The longer a length of the connection line, the larger the line resistance of the connection line. The first connection line 41 may be from the first input terminal 'A41' of the pressure sensor 'S4' to the first power input terminal '$V_{cc1}$'. The second connection line 42 may be from the second input terminal 'A42' of the pressure sensor 'S4' to the second power input terminal '$V_{cc2}$'. The first connection line 31 may be from the first input terminal 'A31' of the pressure sensor 'S3' to the first power input terminal '$V_{cc1}$'. The second connection line 32 may be from the second input terminal 'A32' of the pressure sensor 'S3' to the second power input terminal '$V_{cc2}$'. The first connection line 41 as well as the second connection line 42 may be longer than the first connection line 31 as well as the second connection line 32.

To meet a case where the ratio of the resistance of each pressure sensor 'S' to the sum of the corresponding first line resistance and the second line resistance is the same, a resistance '$R_{S4}$' of the pressure sensor 'S4' may be larger than a resistance '$R_{S3}$' of the pressure sensor 'S3'. These results may be applied to all the pressure sensors 'S' in the array substrate 10, In other words, the resistance of each one pressure sensor 'S' may be proportional to the distance from the first input terminal of the corresponding pressure sensor 'S' to the first power input terminal '$V_{cc1}$'. Alternatively, the resistance of each one pressure sensor 'S' may be proportional to the distance from the second input terminal of the corresponding pressure sensor 'S' to the second power input terminal '$V_{cc2}$'. For example, if the pressure sensor 'S' is a coil-type pressure sensor, the resistance '$R_{S4}$' of the pressure sensor 'S4' may increase by increasing the number of turns of the coil. The resistance '$R_{S4}$' of the pressure sensor 'S4' may increase by other methods.

Optionally, the sum of the first line resistance and the second line resistance corresponding to each pressure sensor may be the same. The resistance of each pressure sensor in the array substrate may be the same for the sake of the simple design of the actual products. Since the ratio of the resistance of each pressure sensor to the sum of the corresponding first line resistance and the second line resistance is the same, the sum of the first line resistance and the second line resistance corresponding to each pressure sensor may be set equal, Referring to FIG. 1 and FIG. 3, the lengths of the first connection line 41 and the second connection line 42 corresponding to the pressure sensor 'S4' may be larger than the lengths of the first connection line 31 and the second connection line 32 corresponding to the pressure sensor 'S3'. The first line resistance of the first connection line 31 or the second line resistance of the second connection line 32 of the pressure sensor 'S3' may increase to meet the case where the ratio of the resistance of each pressure sensor to the sum of the corresponding first line resistance and the second line resistance is the same when the resistance of each pressure sensor is the same.

Figure 4:
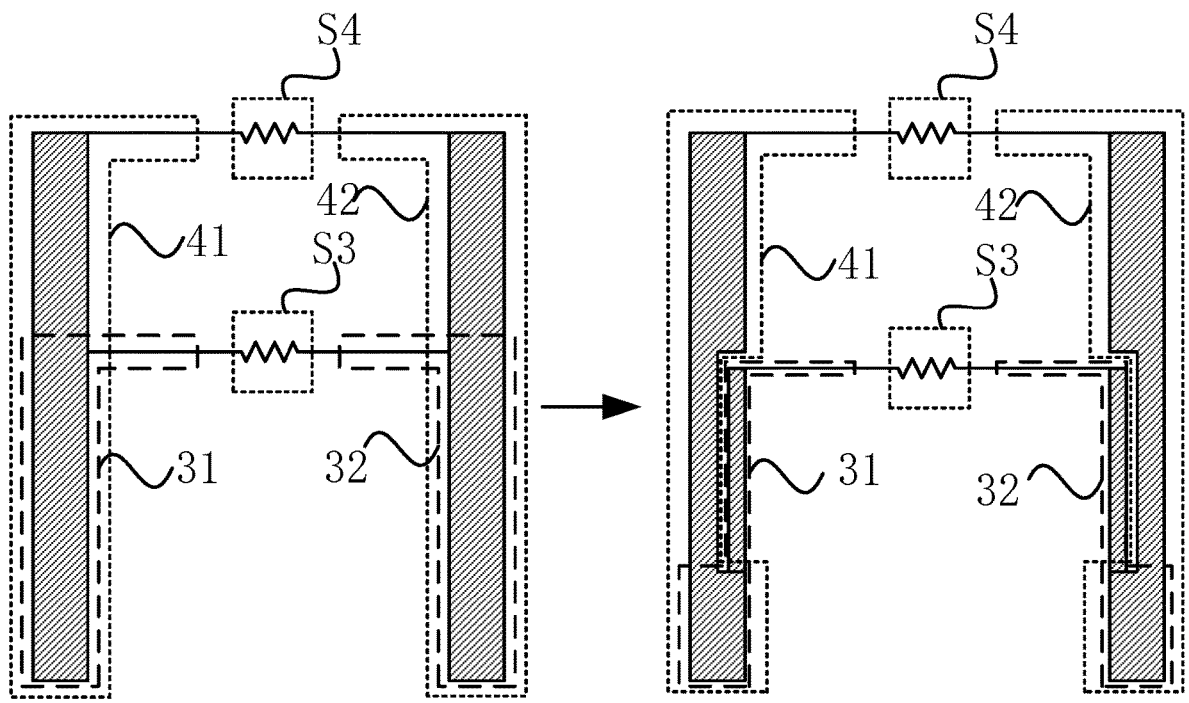
FIG. 4 illustrates a schematic diagram for increasing line resistance in a pressure sensor consistent with various disclosed embodiments of the present disclosure.

For example, for the pressure sensor 'S3', the number of turns of the first connection line 31 may increase, or the cross-sectional area of the first connection line 31 may decrease, to increase the first line resistance of the first connection line 31. The number of turns of the second connection line 32 may increase, or the cross-sectional area of the second connection line 32 may decrease, to increase the second line resistance of the second connection line 32. FIG. 4 illustrates a schematic diagram for increasing the line resistance.

Referring to FIG. 3 and FIG. 4, the first connection lines and the second connection lines corresponding to the pressure sensors 'S3' and 'S4' have common portions as an example. Both the first connection line 31 and the second connection line 32 corresponding to the pressure sensor 'S3' may be split in a circuit connection structure of the pressure sensor illustrated in the right side of FIG. 4 compared to a circuit connection structure of the pressure sensor illustrated in the left side of FIG. 4. Referring to FIG. 3 and FIG. 4, the way of split connection may be equivalent to the addition of the line resistances '$R_{a2}$' and '$R_{b2}$'. The first line resistance of the first connection line 31 corresponding to the pressure sensor 'S3' may be equal to the sum of '$R_{a1}$' and '$R_{a2}$', and the second line resistance of the second connection line 32 corresponding to the pressure sensor 'S3' may be equal to the sum of '$R_{b1}$' and '$R_{b2}$'. In other words, the sum of the first line resistance and the second line resistance corresponding to the pressure sensor 'S3' may increase. The first line resistance and the second line resistance corresponding to the pressure sensor 'S3' may increase by other methods.

Optionally, the sum of the first line resistance and the second line resistance corresponding to the pressure sensor may be inversely proportional to the distance from the first input terminal of the pressure sensor to the first power input terminal. Alternatively, the sum of the first line resistance and the second line resistance corresponding to the pressure sensor may be inversely proportional to the distance from the second input terminal of the pressure sensor to the second power input terminal. Referring to FIG. 3, since the ratio of the resistance of each pressure sensor to the sum of the corresponding first line resistance and the second line resistance is the same, the resistance '$R_{S3}$' of the pressure sensor 'S3' may be set larger than the resistance '$R_{S4}$' of the pressure sensor 'S4'. Referring to FIG. 1 and FIG. 3, the lengths of the first connection line 41 and the second connection line 42 corresponding to the pressure sensors 'S4' may be larger than the lengths of the first connection line 31 and the second connection line 32 corresponding to the pressure sensors S3. The first line resistance of the first connection line 31 corresponding to the pressure sensor 'S3' may increase. Thus, the sum of the first line resistance and the second line resistance corresponding to the pressure sensor 'S3' may be inversely proportional to the distance from the first input terminal of the pressure sensor to the first power input terminal. Alternatively, the second line resistance of the second connection line 32 corresponding to the pressure sensor 'S3' may increase. Thus, the sum of the first line resistance and the second line resistance corresponding to the pressure sensor 'S3' may be inversely proportional to the distance from the second input terminal of the pressure sensor to the second power input terminal. The first line resistance or the second line resistance corresponding to the pressure sensor 'S3' may increase by the methods in the above-described embodiments, and are not repeated herein.

Figure 5:
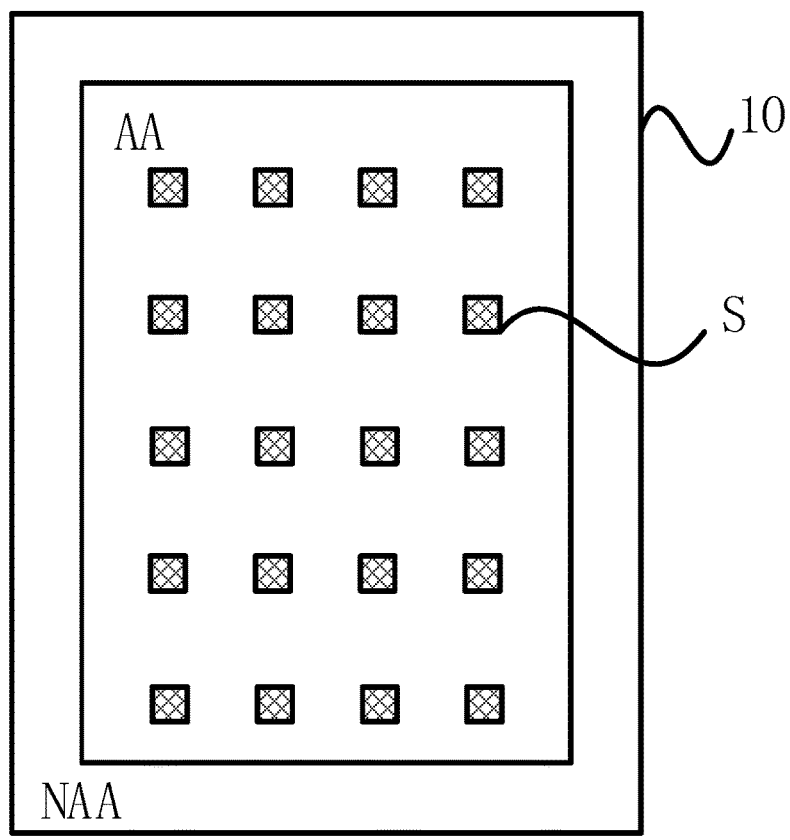
FIG. 5 illustrates a top view of another array substrate consistent with various disclosed embodiments of the present disclosure.

FIG. 5 illustrates a top view of another array substrate consistent with disclosed embodiments. Referring to FIG. 5, the pressure sensor 'S' is located in an opaque area (not illustrated) of the display area 'AA' of the array substrate 10 as an example. For example, when the touch display panel is a liquid crystal touch display panel, the pressure sensor 'S' may be set according to the black matrix in a colorful film substrate. The structure illustrated in FIG. 5 may also satisfy that the ratio of the resistance of each pressure sensor 'S' to the sum of the corresponding first line resistance and the second line resistance is the same. Therefore, the voltages on the first input terminal and the second input terminal of each pressure sensor 'S' may be the same. For the same deformation of the touch display panel under pressure, the detection signal outputted from each pressure sensor is the same. The accuracy of pressure detection performed on the touch display panel may increase, and the difficulty for calibrating the pressure sensor may be reduced. For example, when the touch display panel is an organic light-emitting electro-touch display panel, the pressure sensor 'S' may be provided in a non-opening area of the display area 'AA'.

Figure 6:
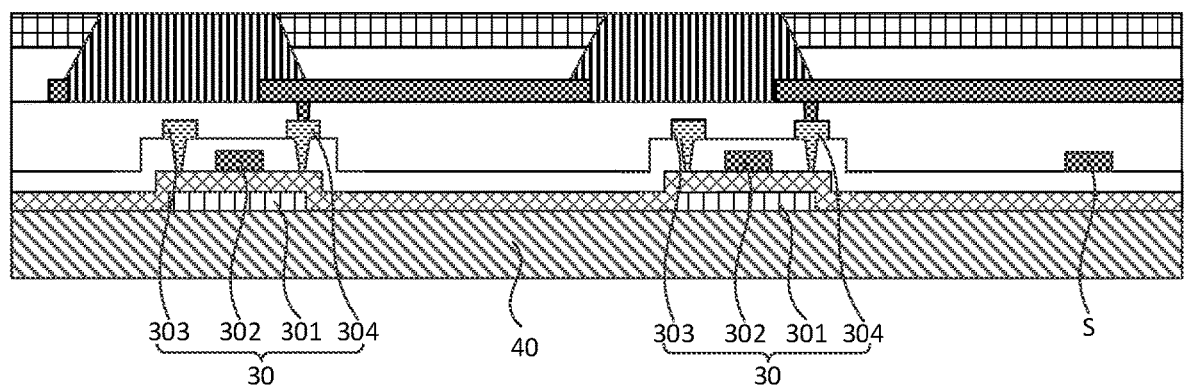
FIG. 6 illustrates a cross-sectional view of another array substrate consistent with various disclosed embodiments of the present disclosure.

FIG. 6 illustrates a cross-sectional view of another array substrate consistent with disclosed embodiments. Referring to FIG. 2 and FIG. 6, the array substrate may include a plurality of thin film transistors 30. Each thin film transistor 30 may sequentially include an active layer 301, a gate 302, as well as a source 303 and a drain 304 provided in the same layer, along a direction away from a substrate 40. For example, the pressure sensor 'S' may be made of a semiconductor material, such as amorphous silicon, or polysilicon, etc. The pressure sensor 'S' may also be made of a metal material. The pressure sensor 'S' may be provided in the same layer as the active layer 301 or any metal layer of the thin film transistor 30. The pressure sensor 'S' is provided in the same layer as the gate 302 of the thin film transistor 30 as an example. The pressure sensor 'S' may be provided in the same layer as the source 303 or the drain 304. The first connection line and the second connection line corresponding to the pressure sensor 'S' may be provided in the same layer as any one of the gate, the source and the drain (not illustrated in FIG. 6) to simplify the fabrication process of the display panel.

Figure 7:
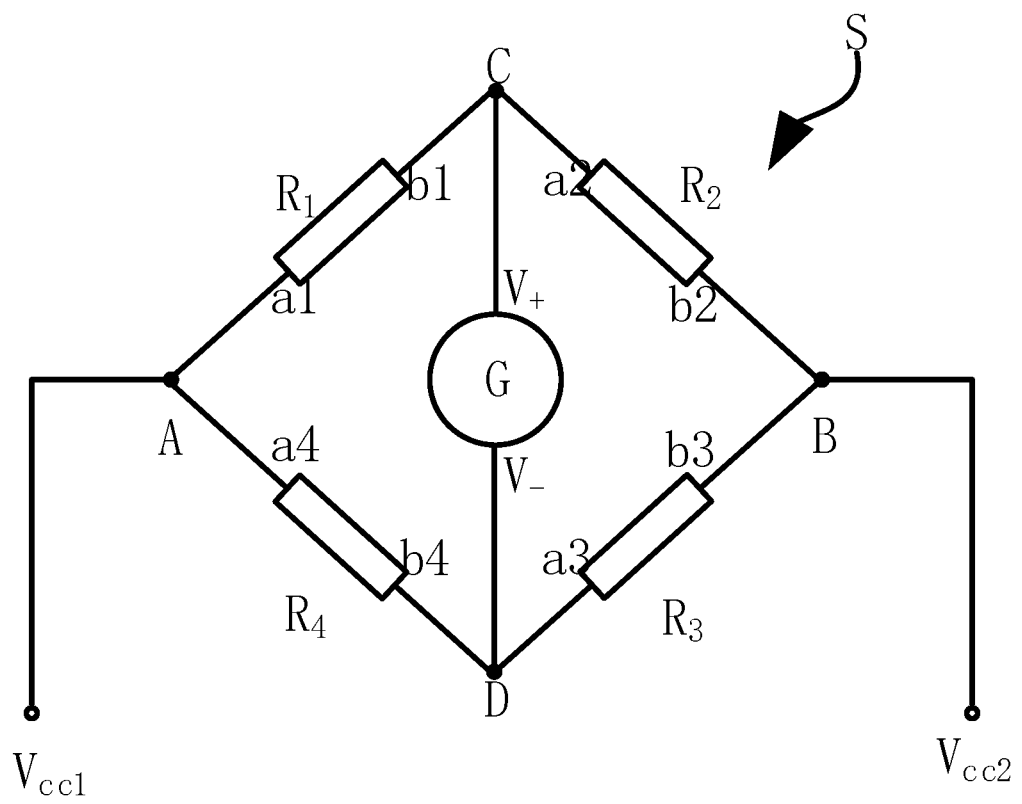
FIG. 7 illustrates a schematic diagram of a pressure sensor consistent with various disclosed embodiments of the present disclosure.

FIG. 7 illustrates a schematic diagram of a pressure sensor consistent with disclosed embodiments. Referring to FIG. 7, each pressure sensor 'S' may include a first sensing resistor '$R1$', a second sensing resistor '$R2$', a third sensing resistor '$R3$', and a fourth sensing resistor '$R4$'. A first terminal 'a1' of the first sensing resistor '$R1$' and a first terminal 'a4' of the fourth sensing resistor '$R4$' may be electrically connected to the first power input terminal '$V_{cc1}$'. A second terminal 'b1' of the first sensing resistor '$R1$' and a first terminal 'a2' of the second sensing resistor '$R2$' may be electrically connected to a first sensing signal measurement terminal '$V_+$'. A second terminal 'b4' of the fourth sensing resistor '$R4$' and a first terminal 'a3' of the third sensing resistor '$R3$' may be electrically connected to a second sensing signal measurement terminal '$V_-$'. A second terminal 'b2' of the second sensing resistor '$R2$' and a second terminal 'b3' of the third sensing resistor '$R3$' may be electrically connected to the second power input terminal '$V_{cc2}$'. For example, the voltage inputted from the first power input terminal '$V_{cc1}$' may be a positive voltage, and the voltage inputted from the second power input terminal '$V_{cc2}$' may be a negative voltage or a zero voltage. For example, the second power input terminal '$V_{cc2}$' may be ground.

For example, the pressure sensor 'S' illustrated in FIG. 7 may have a Wheatstone bridge structure. The first sensing resistor '$R_1$', the second sensing resistor '$R_2$', the third sensing resistor '$R_3$' and the fourth sensing resistor may be connected to form a quadrilateral 'ABCD', and may be referred to four arms of the bridge. The diagonal 'CD' of the quadrilateral 'ABCD' may be connected with a galvanometer 'G'. The two terminals of the galvanometer 'G' may be the first sensing signal measurement terminal '$V_+$' and the second sensing signal measurement terminal '$V_-$', respectively. The diagonal 'AB' of the quadrilateral 'ABCD' may be connected to the first power input terminal '$V_{cc1}$' and the second power input terminal '$V_2$', respectively. The pressure sensor 'S' may include a first output terminal and a second output terminal. The position corresponding to point 'A' may be a first input terminal of the pressure sensor 'S' The position corresponding to point 'B' may be a second input terminal of the pressure sensor 'S'. The position corresponding to point 'C' may be the first output terminal of the pressure sensor 'S'. The position corresponding to point 'D' may be the second output terminal of the pressure sensor 'S'.

When the voltage on the first power input terminal '$V_{cc1}$' is different from the voltage on the second power input terminal '$V_2$', current may flow through each branch line in the bridge structure. When the first sensing resistor the second sensing resistor '$R_2$', the third sensing resistor '$R_3$' and the fourth sensing resistor '$R_4$' satisfy an equation:

$$\frac{R1}{R2} = \frac{R4}{R3},$$

the potential on the point 'C' may be equal to the potential on the point 'D'. Therefore, the current flowing through the galvanometer 'G' may be zero, and the pointer of the galvanometer 'G' may indicate the zero scale. In this case, the bridge may be in equilibrium state, and the equation, $$\frac{R1}{R2} = \frac{R4}{R3},$$

may be referred to the bridge equilibrium condition. When the first sensing resistor '$R_1$', the second sensing resistor '$R_2$', the third sensing resistor '$R_3$' and the fourth sensing resistor '$R_4$' do not satisfy the above-described bridge equilibrium condition, the potential on the point 'C' may be different from the potential on the point 'D'. In this case, the current flowing through the galvanometer 'G' may not be zero, and the pointer of the galvanometer 'G' may be deflected and may output a corresponding signal value. Therefore, the pressure exerted on the pressure sensor 'S' may be detected according to the signal value outputted from the galvanometer 'G'.

The pressure sensor 'S1' illustrated in FIG. 2 is used as an example. The resistance '$R_{S1}$' of the pressure sensor 'S1', the first sensing resistor '$R_1$', the second sensing resistor '$R_2$', the third sensing resistor '$R_3$', and the fourth sensing resistor '$R_4$' may satisfy the following relationship:

$$R_{S1} = \frac{(R_1 + R_2)(R_3 + R_4)}{R_1 + R_2 + R_3 + R_4}.$$

The resistance '$R_{S1}$' of the pressure sensor 'S1' may increase or decrease by adjusting the first sensing resistor '$R_1$' the second sensing resistor '$R_2$', the third sensing resistor '$R_3$', and the fourth sensing resistor '$R_4$'. Therefore, the ratio of the resistance of each pressure sensor to the sum of the corresponding first line resistance and the second line resistance may be the same, and the voltages on the first input terminal and the second input terminal of each pressure sensor may be the same. For the same deformation of the touch display panel under pressure, the detection signal outputted from each pressure sensor may be the same. The accuracy of the pressure detection performed on the touch display panel may increase, and the difficulty for calibrating the pressure sensor may be reduced.

The pressure sensor 'S' illustrated in FIG. 7 is used as an example. Each pressure sensors 'S' may include the first output terminal 'C' and the second output terminal 'D'. The voltage '$U_{in}$' between the first input terminal 'A' and the second input terminal 'B' of each pressure sensor 'S', and the voltage 'V' between the first power input terminal '$V_{cc1}$' and the second power input terminal '$V_{cc2}$' under pressure may satisfy the following relationship:

$$\frac{U_{in}}{V_{cc}} > \frac{\theta \cdot \Delta T \cdot \frac{U_{out}}{U_{in}}}{\theta \cdot \Delta T \cdot \frac{U_{out}}{U_{in}} + GF \cdot \varepsilon} \quad (1\text{-}1)$$

The θ may be a temperature coefficient of the first line resistance or the second line resistance corresponding to the pressure sensor 'S'. The ΔT may be the temperature disturbance subjected to the first line resistance or the second line resistance. The 'GF' may be a strain sensitivity parameter of the pressure sensor 'S'. The ε may be strain of the pressure sensor 'S'. The '$U_{out}$' may be the voltage between the first output terminal 'C' and the second output terminal 'D' without pressure.

The above equation not only takes into account the temperature disturbance factor, but also takes into account the process disturbance factor. Referring to the pressure sensor 'S' illustrated in FIG. 7, when the impact of the production process factors is ignored and the touch display panel is not under pressure, the first sensing resistor '$R_1$', the second sensing resistor '$R_2$', the third sensing resistor '$R_3$' and the fourth sensing resistor '$R_4$' may satisfy the following equation:

$$\frac{R1}{R2} = \frac{R4}{R3}.$$

The potential on the first output terminal 'C' may be the same as the potential on the second output terminal 'D' of the pressure sensor 'S'. In other words, the current flowing through the galvanometer 'G' may be zero, the bridge may be in the equilibrium state.

However, due to the factors of the manufacturing process, the first sensing resistor '$R_1$', the second sensing resistor '$R_2$', the third sensing resistor '$R_3$' and the fourth sensing resistor '$R_4$' may not be exactly the same as the required values, and may have large or small errors. Thus, the bridge structure may not satisfy the above bridge equilibrium condition. Therefore, the voltage between the first output terminal 'C' and the second output terminal 'D' of the pressure sensor 'S' may not be zero, and the voltage '$U_{out}$' between the first output terminal 'c' and the second output terminal 'D' without pressure may not be zero. The $$\frac{U_{out}}{U_{in}}$$

may represent the process disturbance subjected to the pressure sensor 'S'. The above formula may indicate that the change in line resistance caused by the process disturbance and temperature disturbance may need to be less than the change in resistance of the pressure sensor 'S' under pressure. Thus, the pressure sensor 'S' can accurately detect the pressure exerted on the touch display panel.

For example, referring to FIG. 2, the derivation process of the above formula may be described by taking the branch where the pressure sensor 'S1' and the corresponding first connection line 11 and the second connection line 12 are located as an example. The change in the resistance of both the first line resistance '$R_{11}$' and the second line resistance '$R_{12}$' subjected to the process disturbance and temperature disturbance may need to be less than the change in the resistance ΔR of the pressure sensor 'S1' under pressure. In other words:

$$(R_{11} + R_{12}) \cdot \theta \cdot \Delta T \cdot \frac{U_{out}}{U_{in}} < \Delta R \quad (1\text{-}2)$$

The strain sensitivity parameter 'GF' of the pressure sensor 'S1', the strain 'ε' of the pressure sensor 'S1', and the resistance '$R_{S1}$' of the pressure sensor 'S1' may satisfy:

$$GF = \frac{\Delta R}{R_{S1} \cdot \varepsilon} \quad (1\text{-}3)$$

The voltage division ratio 'η' of the first line resistance '$R_{11}$' and the second line resistance '$R_{12}$' in the branch where the pressure sensor 'S1' and the corresponding first connection line 11 and the second connection line 12 are located may satisfy:

$$\eta = \frac{R_{11} + R_{12}}{R_{11} + R_{12} + R_{S1}} \quad (1\text{-}4)$$

Therefore, '1−η' may satisfy:

$$1 - \eta = \frac{R_{S1}}{R_{11} + R_{12} + R_{S1}} \quad (1\text{-}5)$$

The formulas (1-3) (1-4) (1-5) lay be taken into formula (1-2), and the following equation may be obtained:

$$\eta < \frac{GF \cdot \varepsilon}{GF \cdot \varepsilon + \theta \cdot \Delta T \cdot \frac{U_{out}}{U_{in}}}.$$

Therefore, '1−η' may satisfy:

$$1 - \eta = \frac{R_{S1}}{R_{11} + R_{12} + R_{S1}} \quad (1\text{-}6)$$

The '1−η' may represent the voltage division ratio of the resistance '$R_{s1}$' of the pressure sensor 'S1' in the branch where the pressure sensor 'S1' and the corresponding first connection line 11 and the second connection line 12 are located. The '1−η' may satisfy:

$$1 - \eta = \frac{U_{in}}{V_{CC}} \quad (1\text{-}7)$$

The formula (1-1) may be obtained by taking the formula (1-7) into the formula (1-6).

Figure 8:
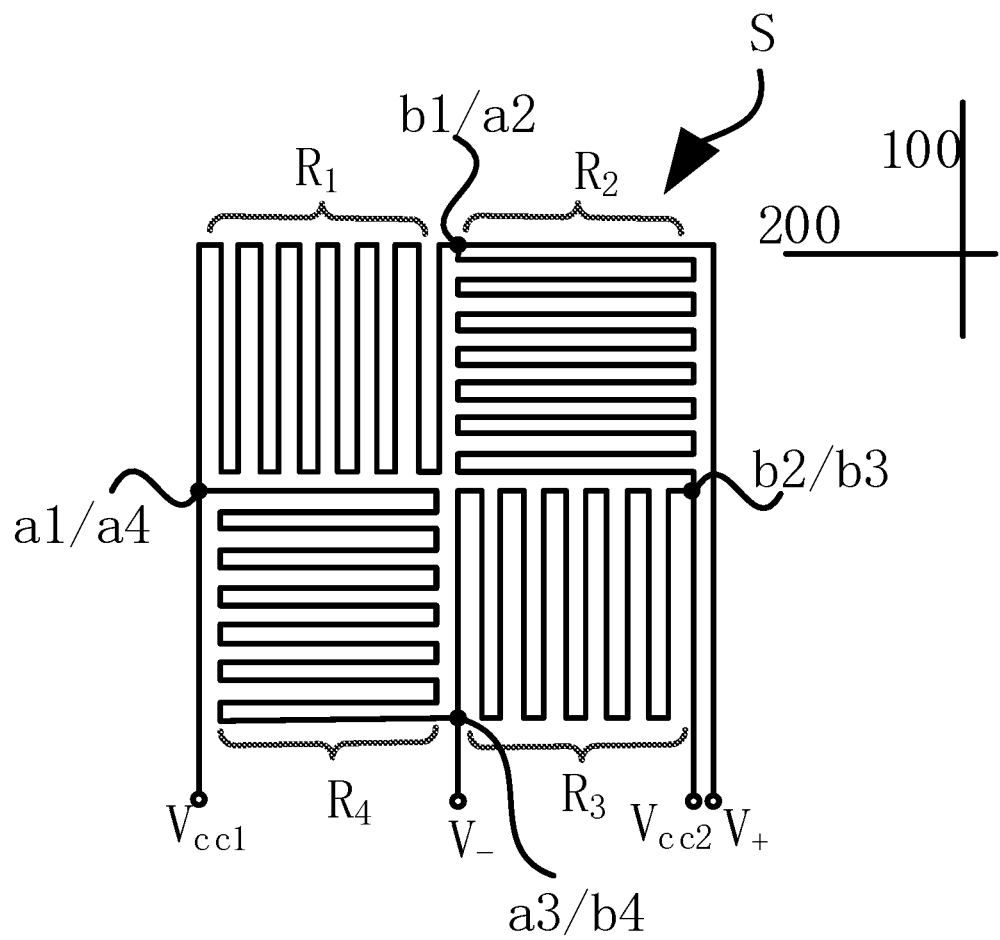
FIG. 8 illustrates a schematic diagram of another pressure sensor consistent with various disclosed embodiments of the present disclosure.

FIG. 8 illustrates a schematic diagram of another pressure sensor consistent with disclosed embodiments. Referring to FIG. 8, the display panel may include a first extension direction 100 and a second extension direction 200. The first extension direction 100 may intersect the second extension direction 200. The component in the first extension direction 100 of an extension length of the first sensing resistor '$R_1$' from the first terminal 'a1' to the second terminal 'b1' may be greater than its component in the second extension direction 200. The component in the second extension direction 200 of an extension length of the second sensing resistor '$R_2$' from the first terminal 'a2' to the second terminal 'b2' may be greater than its component in the first extension direction 100. The component in the first extension direction 100 of an extension length of the third sensing resistor '$R_3$' from the first term 'a3' to the second terminal 'b3' may be greater than its component in the second extension direction 200. The component in the second extension direction 200 of an extension length of the fourth sensing resistor '$R_4$' from the first terminal 'a4' to the second terminal 'b4' may be greater than its component in the first extension direction 100.

In one embodiment, the pressure sensor 'S' illustrated in FIG. 7 may generally require that the deformation subjected to the first sensing resistor '$R_1$', the second sensing resistor '$R_2$' the third sensing resistor '$R_3$' and the fourth sensing resistor '$R_4$' may be different. For example, the first sensing resistor '$R_1$' and the third sensing resistor '$R_3$' may be subjected to a compression deformation. The second sensing resistor '$R_2$' and the fourth sensing resistor '$R_4$' may be subjected to a stretch deformation. Therefore, the first sensing resistor '$R_1$', the second sensing resistor '$R_2$', the third sensing resistor '$R_3$' and the fourth sensing resistor '$R_4$' may be spatially separated. When local temperature changes, the first sensing resistor '$R_1$', the second sensing resistor '$R_2$', the third sensing resistor '$R_3$' and the fourth sensing resistor '$R_4$' may be located in different temperature environments. The temperature may have different effect on the first sensing resistor '$R_1$' the second sensing resistor '$R_2$', the third sensing resistor '$R_3$' and the fourth sensing resistor '$R_4$'. Therefore, the accuracy of pressure detection performed on the pressure sensor 'S' may be affected, and the accuracy for detecting the acceleration of the moving object where the display panel is located may be reduced.

Referring to FIG. 1, FIG. 2, and FIG. 8, the pressure sensor 'S' illustrated in FIG. 8 is used as an example. After applying electrical signals to the first sensing resistor '$R_1$', the second sensing resistor '$R_2$', the third sensing resistor '$R_3$' and the fourth sensing resistor '$R_4$' through the first power input terminal '$V_{cc1}$' and the second power input signal '$V_{cc2}$', the pressure sensing bridge without pressure may satisfy the bridge equilibrium condition and may be in the equilibrium state. The signal value outputted between the first sensing signal measurement terminal '$V_+$' and the second sensing signal measurement terminal '$V_-$' may be zero. When the touch display panel is pressed under pressure, the first sensing resistor and the third sensing resistor '$R_3$' may sense the strain along the first extension direction 100, and the corresponding resistances may change correspondingly. The second sensing resistor '$R_2$' and the fourth sensing resistor '$R_4$' may sense the strain along the second extension direction 200, and the corresponding resistances may change correspondingly. The strain along the first extension direction 100 may be different from the strain along the second extension direction 200, thus resistance changes of '$R_1$' and '$R_2$' may be different from the resistance changes of '$R_3$' and '$R_4$'. In this case, the pressure sensing bridge may not satisfy the bridge equilibrium condition, and may loss equilibrium. The signal value outputted between the first sensing signal measurement terminal '$V_+$' and the second sensing signal measurement terminal '$V_-$' may not be zero. The pressure subjected to the pressure sensor 'S' may be obtained based on the signal value, and the pressure sensing function of the touch display panel may be achieved.

Compared to the pressure sensor illustrated in FIG. 7, in the pressure sensor illustrated in FIG. 8, the first sensing resistor '$R_1$' and the third sensing resistor '$R_3$' may sense the strain along the first extension direction 100, and the second sensing resistor '$R_2$' and the fourth sensing resistor '$R_4$' may sense the strain along the second extension direction 200. Therefore, the first sensing resistor '$R_1$', the second sensing resistor '$R_2$', the third sensing resistor and the fourth sensing resistor '$R_4$' may be distributed in the same region or may be distributed in a small region. Thus, the first sensing resistor the second sensing resistor '$R_2$', the third sensing resistor '$R_3$', and the fourth sensing resistor '$R_4$' may have a synchronous temperature change, Therefore, the influence of the temperature difference may be eliminated and the accuracy for pressure sensing performed on the touch display panel may be improved.

The pressure sensor 'S1' illustrated in FIG. 2 is used as an example. Compared to the pressure sensor 'S illustrated in FIG. 8, referring to FIG. 2, the resistance '$R_{S1}$' of the pressure sensor 'S1' as well as the first sensing resistor '$R_1$', the second sensing resistor '$R_2$', the third sensing resistor '$R_3$', and the fourth sensing resistor '$R_4$' may satisfy:

$$R_{S1} = \frac{(R_1 + R_2)(R_3 + R_4)}{R_1 + R_2 + R_3 + R_4}$$

The resistance '$R_{s1}$' of the pressure sensor 'S1' may increase or decrease by adjusting the first sensing resistor '$R_1$', the second sensing resistor '$R_2$', the third sensing resistor '$R_3$', and the fourth sensing resistor '$R_4$'. Therefore, the ratio of the resistance of each pressure sensor to the sum of the corresponding first line resistance and the second line resistance may be the same, and the voltages on the first input terminal and the second input terminal of each pressure sensor may be the same. For the same deformation of the touch display panel under pressure, the detection signal outputted from each pressure sensor may be the same. The accuracy of pressure detection performed on the touch display panel may increase, and the difficulty for calibrating the pressure sensor may be reduced.

Figure 9:
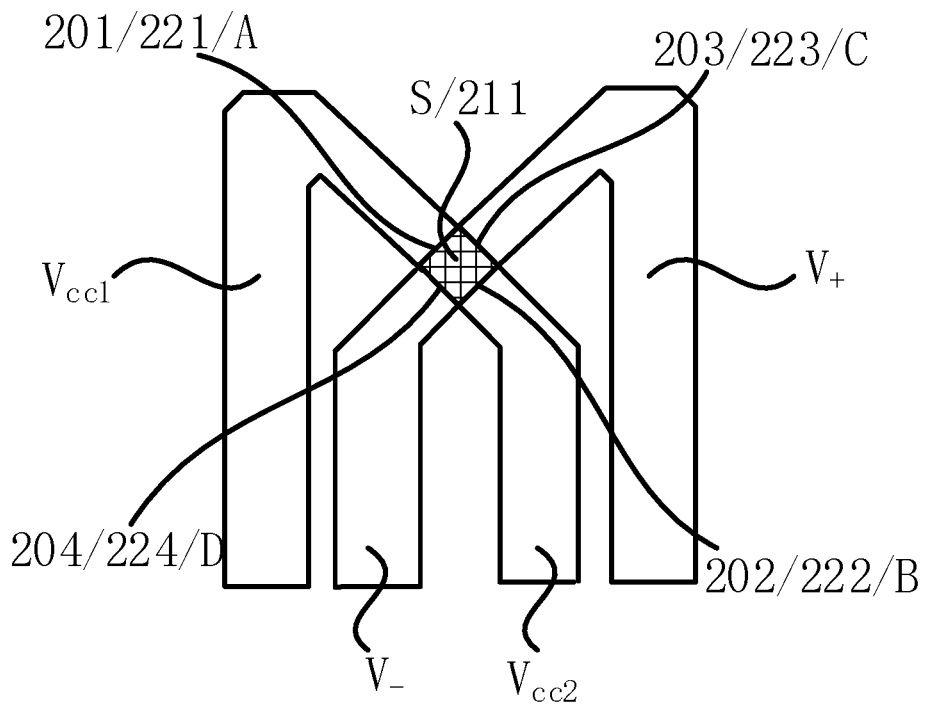
FIG. 9 illustrates a schematic diagram of another pressure sensor consistent with various disclosed embodiments of the present disclosure.

Optionally, the pressure sensor may be in a block shape, and may be made of a semiconductor material. The shape of the pressure sensor may be a polygon having at least four sides. The pressure sensor may include a first connection terminal, a second connection terminal, a third connection terminal, and a fourth connection terminal. The first connection terminal may be the first input terminal, and may be electrically connected to the first power input terminal. The second connection terminal may be the second input terminal, and may be electrically connected to the second power input terminal. The third connection terminal may be the first output terminal, and may be electrically connected to the first sensing signal measurement terminal. The fourth connection signal may be the second output terminal, and may be electrically connected to the second sensing signal measurement terminal. The first connection terminal, the second connection terminal, the third connection terminal, and the fourth connection terminal may be provided on the four sides of the polygon, respectively. The side where the first connection terminal is located may not be connected to the side where the second connection terminal is located, and the side where the third connection terminal is located may not be connected to the side where the fourth connection terminal is located. For example, the pressure sensor 'S' illustrated in FIG. 9 is a quadrilateral as an example. The pressure sensor 'S' may also have other shapes.

For example, referring to FIG. 9, the pressure sensor 'S' may be the quadrilateral. A first connection terminal 201, a second connection terminal 202, a third connection terminal 203, and a fourth connection terminal 204 may be provided on a first side 221, a second side 222, a third side 223 and a fourth side 224 of the pressure sensor 'S', respectively. The first side 221 and the second side 222 of the pressure sensor 'S' may face toward each other, and the third side 223 and the fourth side 224 of the pressure sensor 'S' may face toward each other. The first connection terminal 201 may be the first input terminal 'A' of the pressure sensor 'S', and may be electrically connected to the first power input terminal '$V_{cc1}$'. The second connection terminal 202 may be the second input terminal 'B' of the pressure sensor 'S', and may be electrically connected to the second power input terminal '$V_{cc2}$'. The third connection terminal 203 may be the first output terminal 'C' of the pressure sensor 'S', and may be electrically connected to the first sensing signal measurement terminal '$V_+$'. The fourth connection terminal 204 may be the second output terminal 'D' of the pressure sensor 'S', and may be electrically connected to the second sensing signal measurement terminal '$V_-$', For example, the first power input terminal '$V_{cc1}$' and the second power input terminal '$V_{cc2}$' may apply a bias voltage to the pressure sensor 'S' through the first connection terminal 201 and the second connection terminal 202 of the pressure sensor 'S'. When the touch display panel is pressed under pressure, the resistance value of a strain resistance sheet 211 of the pressure sensor 'S' may change, and the strain voltage outputted from the corresponding first sensing signal measurement terminal '$V_+$' and the second sensing signal measurement terminal '$V_-$' may change accordingly. The pressure subjected to a pressure portion 102 of the pressure sensor 'S' may be detected by detecting the change of the voltage on the strain resistance sheet 211, and the pressure sensing function of the touch display panel may be achieved.

The resistance value of the pressure sensor 'S' illustrated in FIG. 9 may be the resistance value of the strain resistance sheet 211. The ratio of resistance of the strain resistance sheet 211 in each pressure sensor 'S' to the sum of the first line resistance and the second line resistance corresponding to the pressure sensor may be the same. Therefore, voltages on the first input terminal 'A' and the second input terminal of each pressure sensor 'S' may be the same when the voltages on the first power input terminal '$V_{cc1}$' and the second power input terminal '$V_{cc2}$' are the same. For the same deformation of the touch display panel under pressure, the detection signal outputted from each pressure sensor may be the same. The accuracy of pressure detection performed on the touch display panel may increase, and the difficulty for calibrating the pressure sensor may be reduced.

Figure 10:
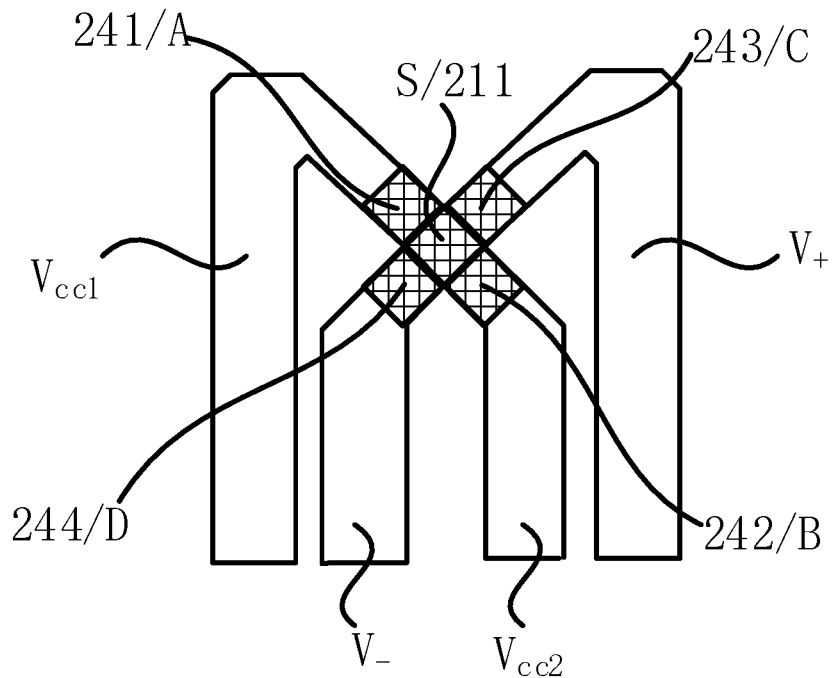
FIG. 10 illustrates a schematic diagram of another pressure sensor consistent with various disclosed embodiments of the present disclosure.

Optionally, the pressure sensor may be in a form of block, and may be made of a semiconductor material. The pressure sensor may include a polygonal body with a shape having at least four sides, as well as a first protrusion, a second protrusion, a third protrusion and a fourth protrusion provided on four sides of the polygon, respectively. The side where the first protrusion is located may not be connected to the side where the second protrusion is located, and the side where the third protrusion is located may not be connected to the side where the fourth protrusion is located. The first protrusion may be the first input terminal, and may be electrically connected to the first power input terminal. The second protrusion may be the second input terminal, and may be electrically connected to the second power input terminal. The third protrusion may be the first output terminal of the pressure sensor, and may be electrically connected to the first sensing signal measurement terminal. The fourth protrusion may be the second output terminal of the pressure sensor, and may be electrically connected to the second sensing signal measurement terminal. For example, the pressure sensor 'S' illustrated in FIG. 10 is a quadrilateral as an example. The pressure sensor 'S' may also have other shapes.

The resistance of the pressure sensor 'S' illustrated in FIG. 10 may be the sum of the resistance of the strain resistance sheet 211 and the resistances of the four protrusions. The ratio of the sum of the resistance of the strain resistance sheet and the resistances of the four protrusions in each pressure sensor 'S' to the sum of the first line resistance and the second line resistance corresponding to the pressure sensor 'S' may be the same. Thus, the voltages on the first input terminal and the second input terminal of each pressure sensor may be the same. For the same deformation of the touch display panel under pressure, the detection signal outputted from each pressure sensor 'S' may be the same. The accuracy of pressure detection performed on the touch display panel may increase, and the difficulty for calibrating the pressure sensor 'S' may be reduced.

Referring to FIG. 10, the first connection terminal 201, the second connection terminal 202, the third connection terminal 203, and the fourth connection terminal 204 illustrated in FIG. 9 may be set as the protrusions on the four sides of the quadrilateral pressure sensor 'S', respectively. The first protrusion 241 may be the first input terminal 'A', and may be electrically connected to the first power input terminal '$V_{cc1}$'. The second protrusion 242 may be the second input terminal 'B', and may be electrically connected to the second power input terminal '$V_{cc2}$'. The third protrusion 243 may be the first output terminal and may be electrically connected to the first sensing signal measurement terminal '$V_+$'. The fourth protrusion 244 may be the second output terminal 'D', and may be electrically connected to the second sensing signal measurement terminal 'V.'. The principle for performing the pressure detection on the pressure sensor illustrated in FIG. 10 may be the same as the detection principle of the pressure sensor illustrated in FIG. 9, and is not described herein. For example, the first protrusion 241, the second protrusion 242, the third protrusion 243, and the fourth protrusion 244 may be made of the same material as the strain resistance sheet 211 of the pressure sensor 'S'. Therefore, the Schottky barrier between the first protrusion 241, the second protrusion 242, the third protrusion 243 as well as the fourth protrusion 244 and the strain resistance sheet 211 of the pressure sensor 'S' may be effectively reduced, and the detection accuracy of the pressure sensor 'S' may be further improved.

Figure 11:
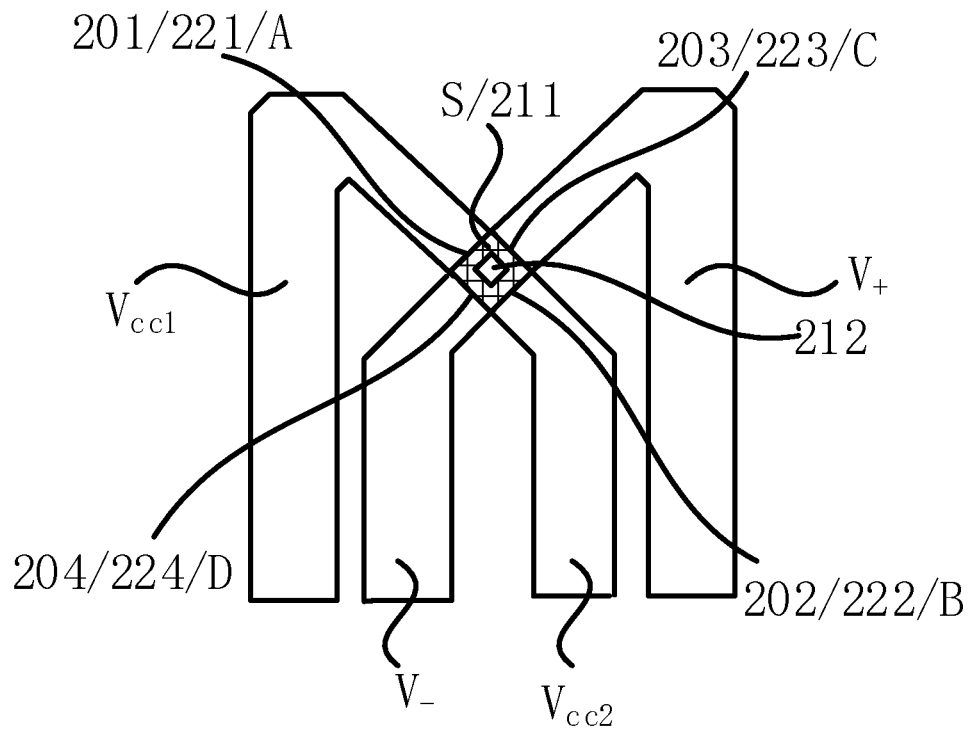
FIG. 11 illustrates a schematic diagram of another pressure sensor consistent with various disclosed embodiments of the present disclosure.

FIG. 11 illustrates a schematic diagram of another pressure sensor consistent with disclosed embodiments. Referring to FIG. 11, on the basis of the pressure sensor 'S' illustrated in FIG. 9, a hollow region 212 may be provided on the pressure sensor 'S'. Since the strain resistance sheet 211 in the pressure sensor 'S' is a full-chip resistor, the conduction area of the strain resistance sheet 211 may be reduced by providing the hollow region 212. In other words, the resistance of the pressure sensor 'S' may increase. The area of the hollow region 212 of the pressure sensor 'S' may be proportional to the distance from the first input terminal 'A' of the pressure sensor 'S' to the first power input terminal '$V_{cc1}$'. Alternatively, the area of the hollow region 212 of the pressure sensor 'S' may be proportional to the distance from the second input terminal 'B' of the pressure sensor 'S' to the second power input terminal '$V_{cc2}$';

For example, referring to FIG. 3 and FIG. 11, the first line resistance '$R_{41}$' and the second line resistance '$R_{42}$' corresponding to the pressure sensor 'S4' may be larger than the first line resistance '$R_{31}$' and the second line resistance '$R_{32}$' corresponding to the pressure sensor 'S3'. The resistance '$R_{S4}$' of the pressure sensor 'S4' may be set larger than the resistance '$R_{S3}$' of the pressure sensor 'S3', to satisfy that the ratio of the resistance of each pressure sensor to the sum of the corresponding first line resistance and the second line resistance is the same. The resistance '$R_{S4}$' of the pressure sensor 'S4' may increase by increasing the area of the hollow region 212. In other words, the area of the hollow region 212 of the pressure sensor may be proportional to the distance from the first input terminal 'A' of the pressure sensor 'S' to the first power input terminal '$V_{cc1}$'. Alternatively, the area of the hollow region 212 of the pressure sensor may be proportional to the distance from the second input terminal 'B' of the pressure sensor 'S' to the second power input terminal '$V_{cc2}$'.

Figure 12:
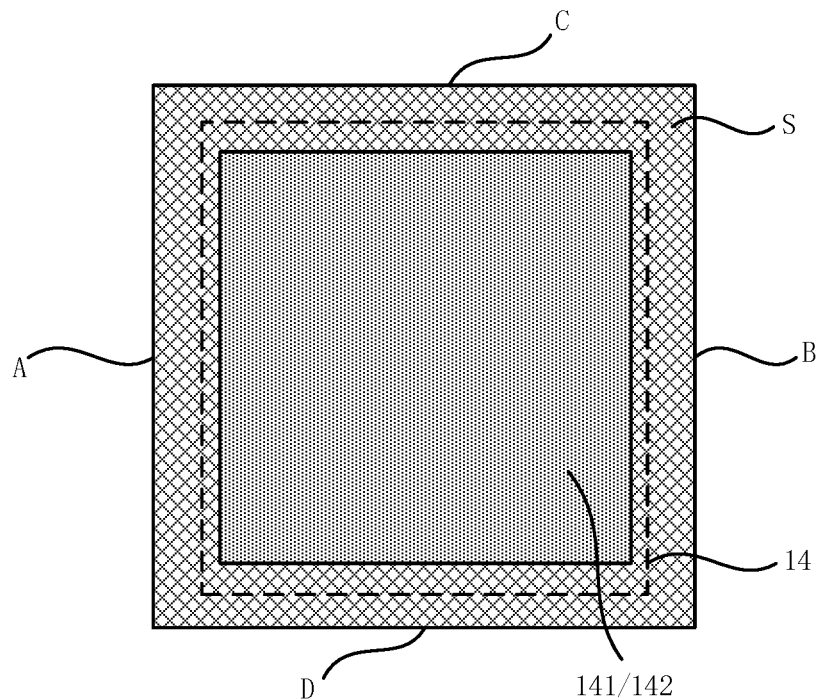
FIG. 12 illustrates a schematic diagram of an arrangement relationship between a control switch and a pressure sensor consistent with various disclosed embodiments of the present disclosure.

Optionally, the array substrate may include a plurality of control switches. Each control switch may be provided in correspondence with one pressure sensor for controlling the operating state of the pressure sensor. FIG. 12 illustrates a schematic diagram of an arrangement relationship between the control switch and the pressure sensor consistent with disclosed embodiments. The pressure sensor 'S' illustrated in FIG. 9 is described as an example. For example, the pressure sensor 'S' may be made of a metal material. A metal layer 142 may be separately formed above the pressure sensor 'S' as a control terminal 141 of the control switch 14. The separately formed metal layer 142 and the pressure sensor 'S' may be insulated from each other. The separately formed metal layer 142 and the pressure sensor 'S' may form a structure similar to a thin film transistor. The separately formed metal layer 142 may be referred to a gate layer of the thin film transistor, and may serve as the control terminal 141 of the control switch 14. The pressure sensor 'S' may be referred to a source-drain layer of the thin film transistor. The connection or disconnection between the first input terminal 'A' and the second input terminal 'B', or between the first output terminal 'C' and the second output terminal of the pressure sensor 'S' may be controlled by the control terminal 141 of the control switch 14. The pressure sensor 'S' in the touch display panel may be avoided to be always on the energized operating state, and the power consumption of the touch display panel when no pressure detection is required may be reduced.

Figure 13:
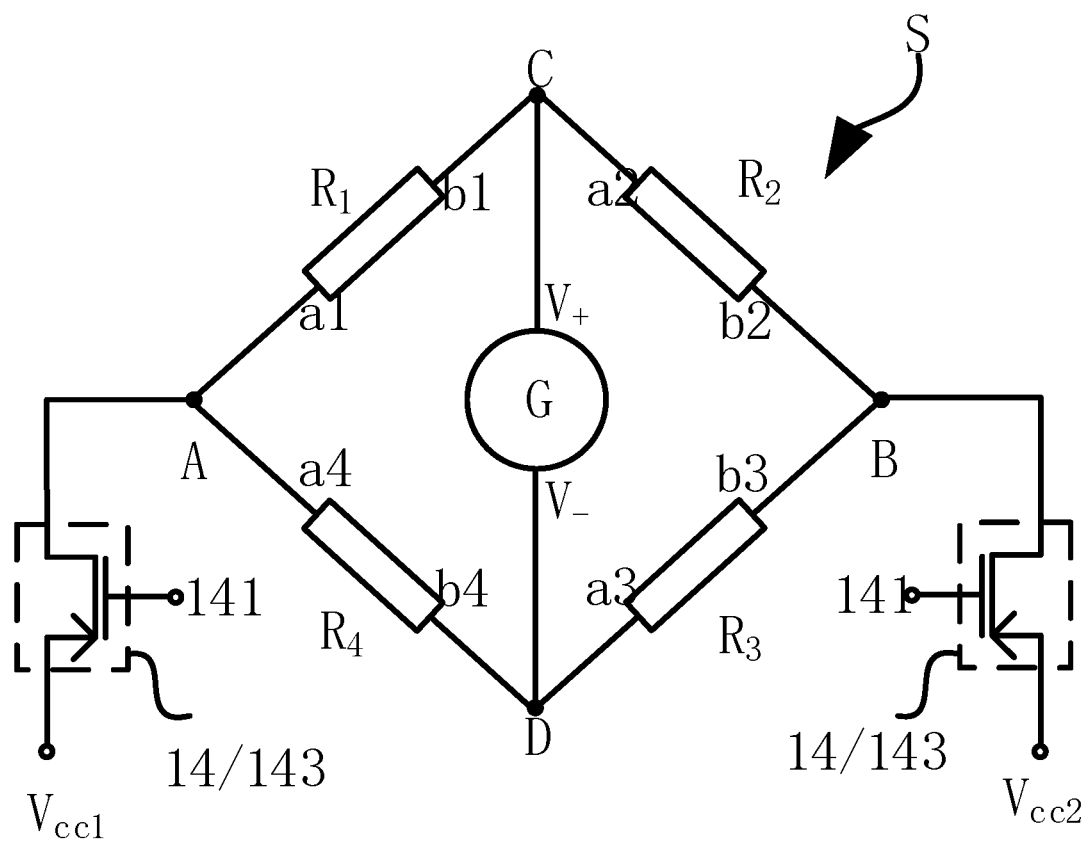
FIG. 13 illustrates another schematic diagram of an arrangement relationship between a control switch and a pressure sensor consistent with various disclosed embodiments of the present disclosure.

For example, FIG. 13 illustrates another schematic diagram of an arrangement relationship between the control switch and the pressure sensor consistent with disclosed embodiments. The pressure sensor 'S' illustrated in FIG. 7 is described as an example.

The control switch 14 may be a separately formed switch tube 143. The switch tube 143 may be connected in series with the first connection line and the second connection line. The connection or disconnection between the first power input terminal '$V_{cc1}$' and the first input terminal 'A' of the pressure sensor, or between the second power input terminal '$V_{cc2}$' and the second input terminal 'B' of the pressure sensor may be controlled by the control terminal 141 of the control switch 14 (the gate of the thin film transistor). The pressure sensor 'S' in the touch display panel may be avoided to be always on the energized operating state, and the power consumption of the touch display panel when no pressure detection is required may be reduced.

Optionally, the array substrate may include a plurality of shift registers in the peripheral circuit area. Each shift register may include a gate signal output terminal. The gate signal output terminal may be electrically connected to the control s itch. For example, referring to FIG. 13, the gate signal output terminal of the shift register may be electrically connected to the control terminal 141 of the control switch 14. The connection or disconnection of the control switch 14 may be controlled by the electrical signal on the gate signal output terminal of the shift register. The pressure sensor 'S' in the touch display panel may be avoided to be always on the energized operating state, and the power consumption of the touch display panel when no pressure detection is required may be reduced. For example, the gate signal output terminal of the shift register may be electrically connected to the gate of the thin film transistor electrically connecting to the pixel unit in the display area of the array substrate, the pixel units in the display area of the array substrate may be provided with step-by-step scan signals.

The embodiments in the present disclosure only illustratively illustrate the size of each element and the thickness of each film layer, and do not represent the actual dimensions of the element and the film layer in the display panel.

The present disclosure provides an array substrate, a touch display panel and a touch display device. A first line resistance of a first connection line between a first input terminal of each pressure sensor and a first power input terminal as well as a second line resistance of a second connection line between a second input terminal of each pressure sensor and a second power input terminal may be provided. Therefore, a ratio of a resistance of each pressure sensor to the sum of the corresponding first line resistance and the second line resistance may be the same. When the voltage on the first power input terminal is equal to the voltage on the second power input terminal, because the ratio of the resistance of each pressure sensor to the sum of the corresponding first line resistance and the second line resistance is the same, the division voltage of each pressure sensor may be the same. In other words, the bias voltage between the first input terminal and the second input terminal of each pressure sensor may be the same. For the same deformation of the touch display panel under pressure, the detection signal outputted from each pressure sensor may be the same. The accuracy of pressure detection performed on the touch display panel may increase, and the difficulty for calibrating the pressure sensor may be reduced.

Figure 14:
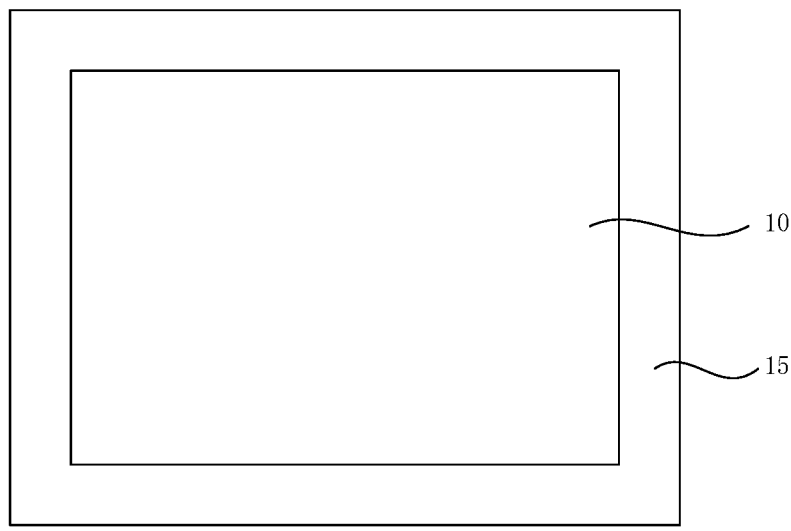
FIG. 14 illustrates a schematic diagram of a touch display panel consistent with various disclosed embodiments of the present disclosure.

The present disclosure also provides a touch display panel. FIG. 14 illustrates a schematic diagram of a touch display panel consistent with disclosed embodiments. Referring to FIG. 14, the touch display panel 15 may include an array substrate 10 in the above-described embodiments. Therefore, the touch display panel 15 in the present disclosure may also have the beneficial effects described in the above embodiments, and are not repeated herein. For example, the touch display panel 15 may be an organic light emitting display panel, or a liquid crystal display panel, etc.

Figure 15:
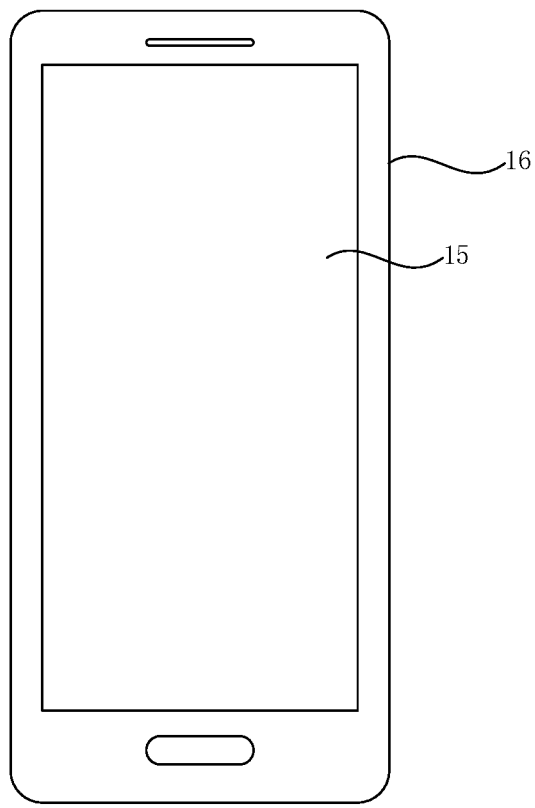
FIG. 15 illustrates a schematic diagram of a touch display device consistent with various disclosed embodiments of the present disclosure.

The present disclosure also provides a touch display device. FIG. 15 illustrates a schematic diagram of a touch display de vice consistent with disclosed embodiments. Referring to FIG. 15, the touch display device 16 may include a touch display panel 15 in the above-described embodiments. Therefore, the touch display device 16 in the present disclosure may also have the beneficial effects described in the above embodiments, and are not repeated herein. For example, the touch display device 16 may be an electronic display device, such as a cell phone, a computer, or a television, etc.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments illustrated herein but is to be accorded the widest scope consistent with the principles and novel features disclosed herein.

What is claimed is:

1. An array substrate, comprising:
    a plurality of pressure sensors, wherein each pressure sensor includes a first input terminal and a second input terminal, the first input terminal is electrically connected to a first power input terminal, and the second input terminal is electrically connected to a second power input terminal;
    a first connection line between the first input terminal of each pressure sensor and the first power input terminal, wherein the first connection line has a first line resistance;
  a second connection line between the second input terminal of each pressure sensor and the second power input terminal, wherein the second connection line has a second line resistance; and
    a ratio of a resistance of each pressure sensor to a sum of the corresponding first line resistance and second line resistance is the same.

2. The array substrate according to claim 1, wherein:
  the first connection lines corresponding to the at least two pressure sensors have a common portion; and
  the second connection lines corresponding to the at least two pressure sensors have a common portion.

3. The array substrate according to claim 1, wherein:
  the resistance of the pressure sensor is proportional to a distance from the first input terminal of the pressure sensor to the first power input terminal.

4. The array substrate according to claim 1, wherein:
  the resistance of the pressure sensor s proportional to a distance from the second input terminal of the pressure sensor to the second power input terminal.

5. The array substrate according to claim 1, wherein:
  the sum of the first line resistance and the second line resistance corresponding to each pressure sensor is the same.

6. The array substrate according to claim 1, wherein:
  the sum of the first line resistance and the second line resistance corresponding to the pressure sensor is inversely proportional to a distance from the first input terminal of the pressure sensor to the first power input terminal.

7. The array substrate according to claim 1, wherein:
  the sum of the first line resistance and the second line resistance corresponding to the pressure sensor is inversely proportional to a distance from the second input terminal of the pressure sensor to the second power input terminal.

8. The array substrate according to claim 1, wherein:
  the pressure sensor includes a first sensing resistor, a second sensing resistor, a third sensing resistor, and a fourth sensing resistor, wherein:
    a first terminal of the first sensing resistor and a first terminal of the fourth sensing resistor are electrically connected to the first power input terminal,
    a second terminal of the first sensing resistor and a first terminal of the second sensing resistor are electrically connected to a first sensing signal measurement terminal,
    a second terminal of the fourth sensing resistor and a first terminal of the third sensing resistor are electrically connected to a second sensing signal measurement terminal, and a second terminal of the second sensing resistor and a second terminal of the third sensing resistor are electrically connected to the second power input terminal.

9. The array substrate according to claim 8, wherein:
the array substrate includes a first extension direction and a second extension direction, wherein the first extension direction intersects the second extension direction;
a component in the first extension direction of an extension length from the first terminal to the second terminal of the first sensing resistor is greater than its component in the second extension direction;
a component in the second extension direction of an extension length from the first terminal to the second terminal of the second sensing resistor is greater than its component in the first extension direction;
a component in the first extension direction of an extension length from the first terminal to the second terminal of the third sensing resistor is greater than its component in the second extension direction; and
a component in the second extension direction of an extension length from the first terminal to the second terminal of the fourth sensing resistor is greater than its component in the first extension direction.

10. The array substrate according to claim 1, wherein:
the pressure sensor is in a form of block;
the pressure sensor is made of a semiconductor material
a shape of the pressure sensor is a polygon having at least four sides; and
the pressure sensor includes a first connection terminal, a second connection terminal, a third connection terminal, and a fourth connection terminal, wherein:
the first connection terminal is the first input terminal and is electrically connected to the first power input terminal,
the second connection terminal is the second input terminal and is electrically connected to the second power input terminal;
the third connection terminal is a first output terminal and is electrically connected to a first sensing signal measurement terminal,
the fourth connection signal is a second output terminal and is electrically connected to a second sensing signal measurement terminal,
the first connection terminal, the second connection terminal, the third connection terminal, and the fourth connection terminal are respectively provided on the four sides of the polygon,
a first side where the first connection terminal is located is not connected to a second side where the second connection terminal is located, and
a third side where the third connection terminal is located is not connected to a fourth side where the fourth connection terminal is located.

11. The array substrate according to claim 10, wherein:
the pressure sensor includes a hollow region; and
an area of the hollow region of the pressure sensor is proportional to a distance from the first input terminal of the pressure sensor to the first power input terminal.

12. The array substrate according to claim 10, wherein:
the pressure sensor includes a hollow region; and
an area of the hollow region of the pressure sensor is proportional to a distance from the second input terminal of the pressure sensor to the second power input terminal.

13. The array substrate according to claim 1, wherein:
the pressure sensor is in a form of block;
the pressure sensor is made of a semiconductor material; and
the pressure sensor includes a polygonal body with a shape having at least four sides, as well as a first protrusion, a second protrusion, a third protrusion and a fourth protrusion respectively provided on four sides of the polygon, wherein:
a side where the first protrusion is located is not connected to a side where the second protrusion is located,
a side where the third protrusion is located is not connected to a side where the fourth protrusion is located,
the first protrusion is the first input terminal and is electrically connected to the first power input terminal,
the second protrusion is the second input terminal and is electrically connected to the second power input terminal,
the third protrusion is a first output terminal of the pressure sensor and is electrically connected to a first sensing signal measurement terminal, and
the fourth protrusion is a second output terminal of the pressure sensor and is electrically connected to a second sensing signal measurement terminal.

14. The array substrate according to claim 13, wherein:
the polygonal body, the first protrusion, the second protrusion, the third protrusion and the fourth protrusion are made of a same material.

15. The array substrate according to claim 1, wherein:
each pressure sensor includes a first output terminal and a second output terminal; and
a voltage '$U_{in}$' between the first input terminal and the second input terminal of each pressure sensor as well as a voltage '$V_{cc}$' between the first power input terminal and the second power input terminal under pressure satisfy a following relationship:

$$\frac{U_{in}}{V_{cc}} > \frac{\theta \cdot \Delta T \cdot \frac{U_{out}}{U_{in}}}{\theta \cdot \Delta T \cdot \frac{U_{out}}{U_{in}} + GF \cdot \varepsilon}$$

wherein:
$\theta$ is a temperature coefficient of the first line resistance or the second line resistance,
$\Delta T$ is a temperature disturbance subjected to the first line resistance or the second line resistance,
GF is a sensitivity parameter of the pressure sensor,
$\varepsilon$ is strain subjected to the pressure sensor, and
$U_{out}$ is a voltage between the first output terminal and the second output terminal without pressure.

16. The array substrate according to claim 1, wherein:
the array substrate includes a display area and a peripheral circuit area surrounding the display area; and
the pressure sensor is provided in the peripheral circuit area, or
the pressure sensor is provided in an opaque area of the display area.

17. The array substrate according to claim 1, further including:
a plurality of control switches, wherein each control switch is provided in correspondence with one pressure sensor for controlling an operating state of the pressure sensor.

18. The array substrate according to claim 17, wherein:
the array substrate includes a display area and a peripheral circuit area surrounding the display area; and the array substrate includes a plurality of shift registers in the peripheral circuit area, wherein each shift register includes a gate signal output terminal electrically connecting to the control switch.

19. A touch display panel, comprising:
an array substrate, wherein the array substrate includes:
a plurality of pressure sensors, wherein each pressure sensor includes a first input terminal and a second input terminal, the first input terminal is electrically connected to a first power input terminal, and the second input terminal is electrically connected to a second power input terminal;
a first connection line between the first input terminal of each pressure sensor and the first power input terminal, wherein the first connection line has a first line resistance;
a second connection line between the second input terminal of each pressure sensor and the second power input terminal, wherein the second connection line has a second line resistance; and
a ratio of a resistance of each pressure sensor to a sum of the corresponding first line resistance and second line resistance is the same.

20. A touch display device, comprising:
a touch display panel, wherein the touch display panel includes an array substrate, and the array substrate includes:
a plurality of pressure sensors, wherein each pressure sensor includes a first input terminal and a second input terminal, the first input terminal is electrically connected to a first power input terminal, and the second input terminal is electrically connected to a second power input terminal;
a first connection line between the first input terminal of each pressure sensor and the first power input terminal, wherein the first connection line has a first line resistance;
a second connection line between the second input terminal of each pressure sensor and the second power input terminal, wherein the second connection line has a second line resistance; and
a ratio of a resistance of each pressure sensor to a sum of the corresponding first line resistance and second line resistance is the same.

* * * * *